UNITED STATES PATENT OFFICE.

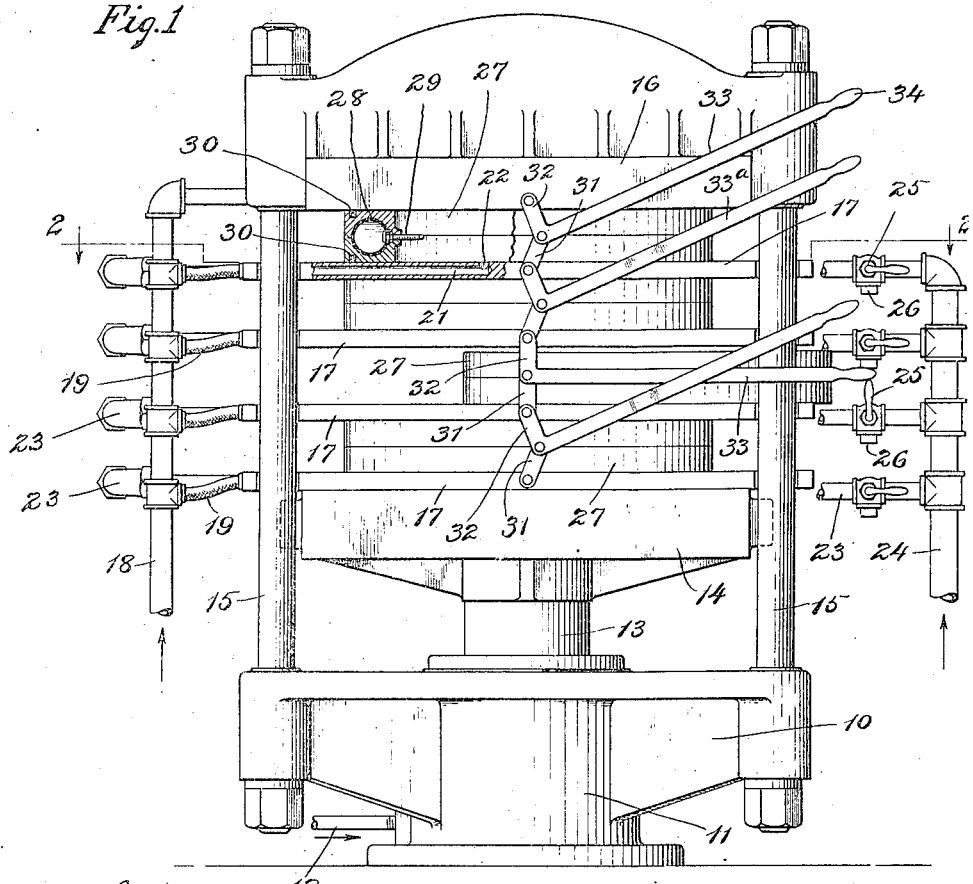
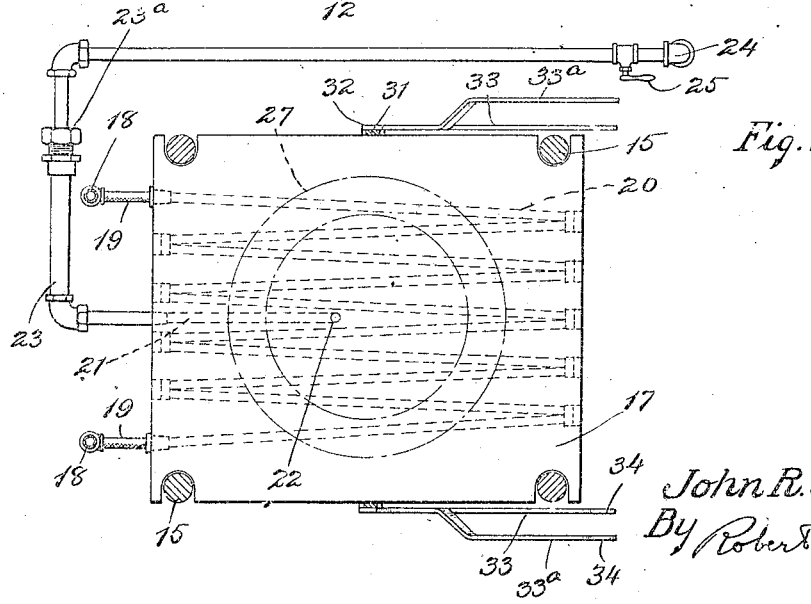

JOHN R. GAMMETER, OF AKRON, OHIO, ASSIGNOR TO THE B. F. GOODRICH COMPANY, OF NEW YORK, N. Y., A CORPORATION OF NEW YORK.

VULCANIZING APPARATUS.

1,414,507.  Specification of Letters Patent.  Patented May 2, 1922.

Application filed January 30, 1922. Serial No. 532,598.

*To all whom it may concern:*

Be it known that I, JOHN R. GAMMETER, a citizen of the United States, residing at Akron, in the county of Summit and State of Ohio, have invented a certain new and useful Vulcanizing Apparatus, of which the following is a specification.

This invention relates to presses, and more particularly hot-plate presses adapted to be used for vulcanizing rubber articles such, for example, as inner tubes or tires, although the invention is not wholly confined to this type of press. My principal object is to provide a press in which the platens, or any pair of them if more than two are employed, may be forced apart against the hydraulic or other yielding pressure which forces the platens together, in order to admit and release the work without requiring the release of the yielding pressure, thus saving considerable time in the changing of the molds or other articles handled in the press. A further object is to provide an improved form of hot-plate press adapted to carry compressed air or other suitable pressure fluid to the middle space of an annular mold and thence to the interior of the tube or other hollow article contained in the mold cavity, without requiring the use of pipe connections with separable couplings which have to be connected and disconnected every time a mold is changed. The means for realizing these objects are usefully combined in a simple form of apparatus now to be described.

Of the accompanying drawings, Fig. 1 is a side elevation, partly in section, showing a vulcanizing press constructed according to my invention.

Fig. 2 is a horizontal section on the line 2—2 of Fig. 1.

In the drawings, 10 is the base casting of the press which includes a hydraulic cylinder 11, having a supply and discharge pipe 12, and provided with a piston or ram 13 which carries the movable platen 14 at its upper end. 15, 15 are the vertical tie-rods forming guides for the movable platens, and 16 is the fixed platen attached to the upper ends of said rods. 17, 17 are intermediate, movable or floating platens parallel with the two end platens 14, 16 and of any suitable number, here shown as four, of which the lowermost rests upon the movable end platen 14. 18, 18 are vertical, trunk steam pipes, one for supply and the other for drainage, connecting at their upper ends with the fixed end platen 16 and having flexible branch connections 19 to the floating platens 17. These platens or hot-plates 17 are relatively thin and provided with plane, parallel working faces, and they are drilled out with a zig-zag heating duct 20, the intermediate ends or apexes of the courses of this duct being plugged at two opposite edges of the plate so that a continuous duct is formed, open only at its two ends to the connections 19.

Each hot-plate 17 is also drilled from one edge between two adjacent courses of the steam duct 20 with an independent fluid duct 21 having an outlet 22 at the upper face of the plate in the central region of the latter, although not necessarily in the exact center. These ducts 21 connect with the branches 23 of a compressed-air-supply pipe 25, and each branch contains a plug-valve or cock 25 for supplying compressed air to said branch from the trunk pipe, or discharging it from the branch into the atmosphere through an outlet 26 from the valve casing. Each branch 23 is further provided with a packed, pivotal connection at 23ª to allow for the vertical movement of its platen 17 through the flexibility of the anterior portion of said branch between the connection 23ª and the trunk pipe 24.

27, 27 are annular two-part molds, preferably made of aluminum for the sake of lightness and heat-conductivity, and 28 is a tubular rubber article, such as an inner tube for a tire, shown in one of the molds. The tubular valve casing 29 of said tube passes through an aperture partially formed in each half of the mold and provides a communication between the interior of the tube and the central space enclosed by the mold.

Each mold is packed against the adjacent platen surface by means of a pair of gaskets 30 of any suitable material, such as rubberized fabric, occupying annular grooves in the respective mold halves.

Each floating platen 17 is connected with its neighbor, and the upper floating platen 17 is connected with the fixed end platen 16 by a pair of toggle links 31, 32, and the upper link 32 of each pair has extending substantially at right angles thereto a relatively-long lever-arm 33 or 33ª, formed with a handle 34 at its outer end. Each alternate arm 33 is straight, but the intermediate arm 33ª is off-set, as shown, so that adjacent arms can cross each other when one of them is being turned horizontally, as indicated in Fig. 1. The toggle and handle-arm device for each mold-compartment between a pair of platens is duplicated on opposite sides of the press, as shown in Fig. 2, and the two handles of each set are operated simultaneously.

In the operation of this invention, it will be evident that any one of the mold-compartments can be opened against the hydraulic pressure in the cylinder 11 for the insertion or removal of a mold by depressing the corresponding pair of handle-arms 33 or 33ª into a horizontal position and thereby straightening the corresponding toggles 31, 32, the platens being closed again upon the fresh mold by restoring said pair of handle-arms to its upwardly inclined position. In Fig. 1, the third mold from the top of the tier is shown in the act of being changed, while the adjacent platens 17 are separated in the manner described. This greatly speeds up the operation of changing the molds, but makes it unnecessary to discharge and recharge the hydraulic cylinder for each change. The curing periods for the several molds are made to begin at different times, so as to overlap and require the changing of only one mold at a time. When the platens are closed upon the mold 27, the central space surrounded by said mold is closed at top and bottom by the platens and is effectively sealed by the gaskets 30. Upon admitting compressed air from the trunk pipe 24, through the corresponding branch 23, duct 21, the central mold space, and valve pipe 29, into the interior of the tube 28, which is being cured, said tube will be distended against the mold in the desired manner, and when it comes to changing the molds, no pipe-couplings have to be connected and disconnected, it being merely necessary to turn off and exhaust the compressed air from the tube at the cock 25, before the press compartment is opened to release the mold.

My invention is not limited to the use of all of the described expedients in a single apparatus, and the details may be variously modified.

I claim:

1. In a press, the combination of a pair of press members, means for yieldingly forcing said members together, and positive means acting counter to the pressure of said forcing means for separating said members.

2. In a press, the combination of a pair of press platens, means for yieldingly forcing said platens together, and a lever device acting counter to said forcing means for positively separating said platens for the insertion or removal of the work.

3. In a press, the combination of a pair of press platens, a fluid-pressure device for yieldingly forcing said platens together, and lever mechanism acting counter to said device for positively separating said platens.

4. In a press, the combination of a pair of press platens, means for yieldingly forcing said platens together, a pair of toggle links interposed between the platens and adapted when straightened to force them apart, and a relatively-long lever-handle on one of said links.

5. In a press, the combination of a pair of relatively movable end platens, means for yieldingly forcing them together, an intermediate platen, and means acting counter to said forcing means for individually opening either of the compartments between the respective end platens and the intermediate platen without opening the other such compartment.

6. In a press, the combination of a pair of relatively-movable end platens, means for yieldingly forcing them together, an intermediate floating platen, and individually-operable toggles acting between said floating platen and the respective end platens for opening either of the compartments on opposite sides of said floating platen against the pressure of said forcing means without opening the other such compartment.

7. In a press, the combination of a pair of relatively-movable end platens, means for yieldingly forcing them together, a series of intermediate floating platens, and a series of positively-acting devices interposed between successive pairs of platens for opening the compartment between any such pair against the pressure of said forcing means without opening the other such compartments.

8. In a press, the combination of a fixed upper platen, a vertically-movable lower platen having fluid-pressure operating means, and a lever device interposed between said platens for depressing the lower platen against the fluid pressure.

9. In a press, the combination of a fixed upper platen, a vertically-movable lower platen having fluid-pressure operating means, one or more intermediate floating platens, and lever devices interposed between the several platens for opening the compartment between any pair against the fluid pressure without opening the other compartments.

10. In a heating press, the combination of a pair of relatively-movable platens having heating connections, means for yieldingly forcing said platens together, and positive means acting counter to the pressure of said forcing means for separating the platens.

11. In a heating press, the combination of a pair of relatively-movable end platens and one or more intermediate floating platens, heating connections to said platens, means for yieldingly forcing the platens together, and lever devices interposed between the several platens for individually and positively separating the members of any pair against the pressure of said forcing means.

12. In a heating press, the combination of a pair of relatively-movable platens adapted to compress between them an annular mold, means for supplying heat to one of said platens, and a duct in one of the platens, independent of said heat-supplying means and having an outlet at the operating face of said platen for supplying fluid under pressure to the space between the platens.

13. In a heating-press platen, a zig-zag heating duct formed in the body of the platen, and an independent fluid-pressure supply duct formed in the platen between two courses of said heating duct and having an outlet at one face of the platen in the central region thereof.

14. In a heating press, the combination of a pair of relatively-movable platens, at least one of which is provided with means for the circulation of a heating fluid, an annular mold forming a closed chamber with said platens, and a duct in one of the platens for carrying a pressure fluid to said chamber.

15. In a heating press, the combination of an annular mold adapted to contain an inflatable, tubular, rubber article and having an opening in its inner peripheral wall for the passage of an inflating pipe, annular gaskets at the upper and lower faces of said mold and a pair of relatively-movable press-platens, at least one of which is piped for a heating fluid, one of said platens having a duct for supplying a pressure fluid to the chamber enclosed between said platens and the mold.

16. In a press, the combination of a pair of relatively-movable platens, at least one of which is provided with heating means, means for yieldingly forcing said platens together, mechanism for separating the platens against the pressure of said forcing means, an annular mold removably mounted between the platens and forming a closed chamber therewith, a pipe connected with one of the platens for supplying compressed air to said chamber, and valve mechanism connected with said pipe for charging and discharging said chamber.

17. In a hot-plate press, the combination of a fixed upper platen having steam connections and a movable lower platen provided with hydraulic actuating means, a series of intermediate platens having steam connections and also having compressed-air connections and compressed-air outlets at their upper surfaces, annular molds removably mounted in the compartments between the platens and adapted to receive compressed air through their inner peripheries from the chambers enclosed between them and the adjacent platens, and lever devices interposed between the successive pairs of platens for individually separating the members of any pair against the hydraulic pressure.

In witness whereof I have hereunto set my hand this 27th day of January, 1922.

JOHN R. GAMMETER.